US010592751B2

(12) United States Patent
Chen et al.

(10) Patent No.: US 10,592,751 B2
(45) Date of Patent: Mar. 17, 2020

(54) METHOD AND SYSTEM TO GENERATE TARGETED CAPTIONS AND SUMMARIZE LONG, CONTINUOUS MEDIA FILES

(71) Applicant: FUJI XEROX CO., LTD., Tokyo (JP)

(72) Inventors: Bor-Chun Chen, College Park, MD (US); Yin-Ying Chen, Sunnyvale, CA (US); Francine Chen, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 148 days.

(21) Appl. No.: 15/424,737

(22) Filed: Feb. 3, 2017

(65) Prior Publication Data
US 2018/0225519 A1     Aug. 9, 2018

(51) Int. Cl.
*G06K 9/00* (2006.01)
*G06K 9/46* (2006.01)

(52) U.S. Cl.
CPC ..... *G06K 9/00751* (2013.01); *G06K 9/00765* (2013.01); *G06K 9/00771* (2013.01); *G06K 9/4628* (2013.01); *G06K 2009/00738* (2013.01)

(58) Field of Classification Search
None
See application file for complete search history.

(56) References Cited

U.S. PATENT DOCUMENTS

| | | | | |
|---|---|---|---|---|
| 5,784,487 A * | 7/1998 | Cooperman | ....... | G06K 9/00469 382/112 |
| 7,607,097 B2 * | 10/2009 | Janakiraman | ....... | H04M 1/2474 715/753 |
| 2007/0009155 A1 * | 1/2007 | Potts | ........ | G06K 9/00 382/182 |
| 2017/0127016 A1 * | 5/2017 | Yu | ....... | G06K 9/00711 |
| 2017/0132526 A1 * | 5/2017 | Cohen | ................. | G06N 99/005 |
| 2017/0177972 A1 * | 6/2017 | Cricri | ................. | G06K 9/4671 |
| 2017/0200066 A1 * | 7/2017 | Wang | ................. | G06K 9/00664 |
| 2017/0357877 A1 * | 12/2017 | Lin | ..................... | G06K 9/00228 |
| 2018/0052828 A1 * | 2/2018 | Na | .......................... | G10L 25/30 |
| 2018/0061439 A1 * | 3/2018 | Diamos | ................... | G10L 21/10 |
| 2018/0124331 A1 * | 5/2018 | Min | .................... | G06K 9/00758 |
| 2018/0144248 A1 * | 5/2018 | Lu | .......................... | G06F 17/241 |

(Continued)

OTHER PUBLICATIONS

Vinyals, Oriol, et al. "Show and tell: A neural image caption generator." Proceedings of the IEEE conference on computer vision and pattern recognition. 2015.*

(Continued)

*Primary Examiner* — Andrae S Allison
(74) *Attorney, Agent, or Firm* — Procopio, Cory, Hargreaves & Savitch LLP (57) ABSTRACT

A method of generating a summary of a media file that comprises a plurality of media segments is provided. The method includes calculating, by a neural network, respective importance scores for each of the media segments, based on content features associated with each of the media segments and a targeting approach, selecting a media segment from the media segments, based on the calculated importance scores, generating a caption for the selected media segment based on the content features associated with the selected media segment, and generating a summary of the media file based on the caption.

22 Claims, 8 Drawing Sheets

(56) References Cited

U.S. PATENT DOCUMENTS

2018/0181592 A1* 6/2018 Chen ................ G06F 17/30253

OTHER PUBLICATIONS

You, Quanzeng, et al. "Image captioning with semantic attention." Proceedings of the IEEE conference on computer vision and pattern recognition. 2016.*
Li et al, MAM-RNN: Multi-level Attention Model Based RNN for Video Captioning, Proceedings of the Twenty-Sixth International Joint Conference on Artificial Intelligence (IJCAI-17).*
Soh, Moses. "Learning CNN-LSTM architectures for image caption generation." (2016).*
Chen, Yubo, et al. "Event extraction via dynamic multi-pooling convolutional neural networks." Proceedings of the 53rd Annual Meeting of the Association for Computational Linguistics and the 7th International Joint Conference on Natural Language Processing (vol. 1: Long Papers). 2015. (Year: 2015).*
Collobert, Ronan; Weston, Jason; "A Unified Architecture for Natural Language Processing: Deep Neural Networks With Multitask Learning", 8 Pages, ICML 2008.
Senina, Anna; Rohrbach, Marcus; et al., "Coherent Multi-Sentence Video Description With Variable Level of Detail", 10 Pages, GCPR 2014.
Venugopalan, Subhashini; Rohrbach, Marcus; et al., "Sequence to Sequence—Video to Text", 9 Pages, ICCV 2015.
Yu, Haonan; Wang, Jiang; et al., "Video Paragraph Captioning Using Hierarchical Recurrent Neural Networks", 10 Pages, CVPR 2016.
Zhang, Ke; Chao, Wei-Lun; et al., "Video Summarization With Long Short-Term Memory", 24 Pages, ECCV 2016.

* cited by examiner

METHOD AND SYSTEM TO GENERATE TARGETED CAPTIONS AND SUMMARIZE LONG, CONTINUOUS MEDIA FILES

BACKGROUND

Field

The present disclosure relates to media processing equipment, and more specifically, to systems and methods for generating captions and summarizing media files.

Related Art

With the increased prevalence of recording devices, video and audio may be used to track what has happened, where it has happened and to whom it has happened. For example, surveillance videos and/or life-logging videos may be used to track events occurring at a location or in a person's life.

However, reviewing and navigating such video or audio content from such devices may be a time-consuming process, particularly for long media files videos that are captured for the purpose of tracking without any editing. For example, surveillance videos may have hours of inaction or recurring static action that must be reviewed to find an event that only last a few minutes. Related art systems may allow rapid scanning of the media files, but do not allow for automatic generation of captions and summarization of long, continuous media files.

SUMMARY

Aspects of the present application may include a method of generating a summary of a media file that comprises a plurality of media segments. The method includes calculating, by a neural network, respective importance scores for each of the media segments, based on content features associated with each of the media segments and a targeting approach, selecting a media segment from the media segments, based on the calculated importance scores, generating a caption for the selected media segment based on the content features associated with the selected media segment, and generating a summary of the media file based on the caption.

Further aspects of the present application may include a non-transitory computer readable medium having stored therein a program for making a computer execute a method of generating a summary of a media file that comprises a plurality of media segments. The method includes calculating, by a neural network, respective importance scores for each of the media segments, based on content features associated with each of the media segment and a targeting approach, selecting a media segment from the media segments, based on the calculated importance scores, generating a caption for the selected media segment based on the content features associated with the selected media segment, and generating a summary of the media file based on the caption.

Additional aspects of the present application may include a media analysis device including a communications bus configured to receive a media file that comprises a plurality of media segments, a memory configured to store the media file, and a processor. The processor may execute a process including calculating, by a neural network, respective importance scores for each of the media segments, based on content features associated with each of the media segment and a targeting approach, selecting a media segment from the media segments, based on the calculated importance scores, generating a caption for the selected media segment based on the content features associated with the selected media segment, and generating a summary of the media file based on the caption.

Still further aspects of the present application may include a media analysis device including means for receiving a media file that comprises a plurality of media segments, means for storing the media file, means for calculating, by a neural network, respective importance scores for each of the media segments, based on content features associated with each of the media segment and a targeting approach, means for selecting a media segment from the media segments, based on the calculated importance scores, means for generating a caption for the selected media segment based on the content features associated with the selected media segment, and means for generating a summary of the media file based on the caption.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

To address the problems of related systems, example implementations of the present application may use targeted video captioning to generate captions for the media content that are automatically selected for a specific purpose (e.g., a targeting approach). The capability to target specific content can help users focus on the media segments of interest and improve the compactness of the segments requiring review. Moreover, the generated captions can present semantic text descriptions of the corresponding video content for more efficient review and navigation of the entire media file.

Figure 1:
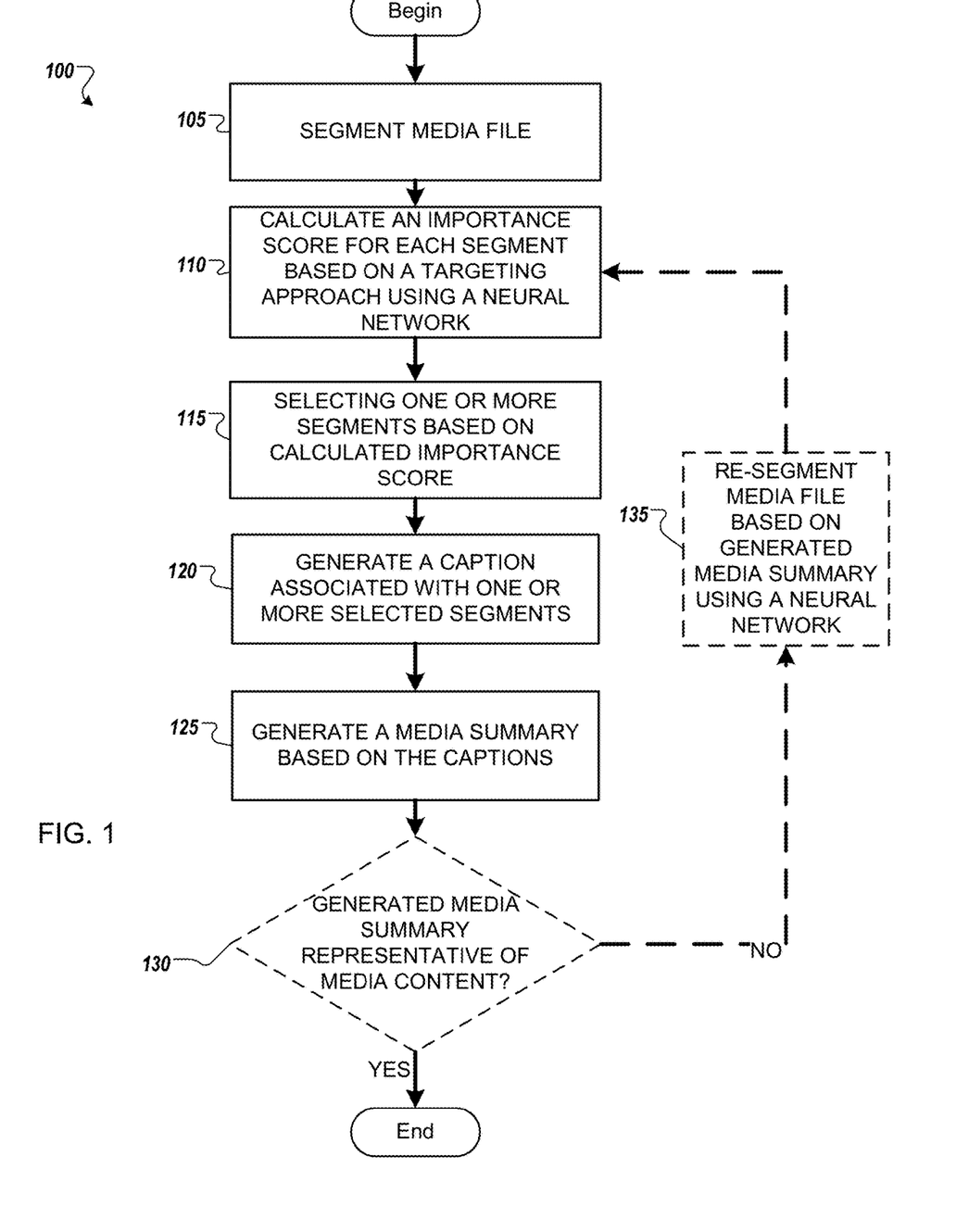
FIG. 1 illustrates an example flow diagram of a process for generating captions and media summaries according to example implementations of the present application.

FIG. 1 illustrates an example flow diagram of a process 100 for generating captions and media summaries according to example implementations of the present application. At 105, a media file is segmented into a plurality of segments. The type of media file could include a video file, an audio file, or any other continuous media files capable of being divided into segments. The media file may be captured using a video recording device (such as a video camera), an audio recording device (such as a microphone and digital recorder), or any other media recording device that may be apparent to a person of ordinary skill in the art.

The size of each segment is not particularly limited. In some example implementations, each segment may be a single still frame of video, a few second of video, or a video segment of any length that might be apparent to a person of ordinary skill in the art. In other example implementations, each segment may be a second of audio, a few seconds of audio or an audio segment of any length that might be apparent to a person of ordinary skill in the art The process of segmentation is not particularly limited and may be a manual process performed by a user, a fully automated process performed using machine learning, or hybrid process involving some automation and some user control. For example, a user may manually segment the media file in some example implementations. In other example implementations, the media file may be automatically segmented by a neural network detecting changes in content within the media file and dividing the video into segments based on the detected changes in content. Content detection is discussed in greater detail below. For example, scene changes (e.g., changes from inside to outside, or night to day) in a video may be detected, and the video may be segmented based on the scene changes. In a hybrid process, a neural network may suggest segments by detecting the content changes and a user may manually approve, reject, or modifying the suggested segments. The user approvals/rejections may be used to further train the neural network.

At 110, an importance score is calculated for each segment based on a targeting approach using the neural network. In some example implementations, the selected targeting approach may be manually selected by a user using a user interface (UI) such as UI 400 illustrated in FIG. 4. In other example implementations, the targeted approach may be selected or suggested by a neural network based on content detected in the media file. Content detection is discussed in greater detail below. An option to approve, reject, and/or modify the selected or suggested targeting approach may be also provided to a user.

A variety of targeting approaches may be used. Example targeting approaches may include:

General Highlight Approach: Generating captions to summarize the general highlights or events of a long media file (e.g., telling a story of videos taken on a long trip);

High Risk Approach: Generating captions to identify high-risk or abnormal events of a surveillance media recording (e.g., generating text alerts of crashes or fights);

Person Name Approach: Generating captions to summarize a target person's (or entity's) activities in a crowd/sports/family media file (e.g., featuring a kid or a couple, and allowing each person in the video to be separately featured);

Happy/Sad Moment Approach: Generating captions to summarize emotional (or entity state) segments of a life logging media file (e.g., keeping a diary of happy or sad moments in life);

Attention Approach—Generating captions to summarize the intervals of attention in a first person perspective media file (e.g., describing what a shopper, wearing a first person perspective camera, is paying attention to).

Though specific targeting approaches are identified, potential targeting approaches are not limited to these examples. Other targeting approaches may be used or these targeting approaches may be combined, modified, or blended in various combinations that may be apparent to a person of ordinary skill in the art.

To calculate an importance score, the neural network may extract content features from each segment using one or more content detection techniques. For example, object recognition, character recognition, and/or facial recognition techniques may be applied to images in the segments of the media file to determine image content. Similarly, audio recognition techniques may be applied to audio in the segments of the media file to detect speaker changes, and recognize speech in the audio, to identify speech content. Additionally, metadata associated with the segments of the media file may be analyzed to detect time and date information associated with the media file. Further, the metadata may also include location data, such as GPS information, that could be used to detect locations where the segments of the media file have been captured.

The neural network may assign an importance score to each segment based on the detected content features. In some example implementations, the importance score may be a qualitative measure assigned by the neural network based on how related the content features, which are associated with each segment, are to the targeting approach strategy. For example, segments having content features indicative of lots of activity occurring may be assigned high importance scores (e.g., a "10") and segments having content features indicative of no activity occurring may be assigned low importance scores (e.g., a "0) in a "High Risk" targeting approach. As another example, segments having content features indicative of a particular person may be assigned high importance scores (e.g., a "10") and segments having no content features indicative of the particular person may be assigned low importance scores (e.g., a "0) in an "Person Name" targeting approach. The calculation of the importance scores by the neural network is discussed in greater detail below with respect to FIGS. 5 and 6. The neural network may be manually trained to assign the importance scores using a training process, such as the process 200 illustrated in FIG. 2.

At 115, one or more segments may be selected from the plurality of segments based on the importance scores. The segments may be selected by ranking the segments based on the importance scores and selecting one or more segments having the highest importance scores for the selected targeting approach. The selection of segments may consider the distribution of segments throughout the media file. The number of segments selected may be manually determined by a user using the user interface 400 of FIG. 4 to specify a number of captions in some example implementations. In other example implementations, the number of segments may be selected automatically by the neural network based on the total number of segments and/or the number of segments having an importance score exceeding a threshold. For example, if the media file is divided into one hundred segments and ten segments have importance scores greater than "6", ten segments may be selected.

At 120, a caption may be automatically generated for each of the selected segments. In some example implementations, the caption may be generated by selecting semantics (e.g., lexical units such as syllables, words and phrases) from a semantic library based on the content features extracted from each of the candidate segments. Further, in some example embodiments, the captions may be generated by a neural network as discussed in greater detail below with respect to FIGS. 5 and 6. The neural network may be trained using a training process, such as process 300 illustrated in FIG. 3. In some example implementations, different neural networks may be used in 110 and 120, respectively.

Figure 7:
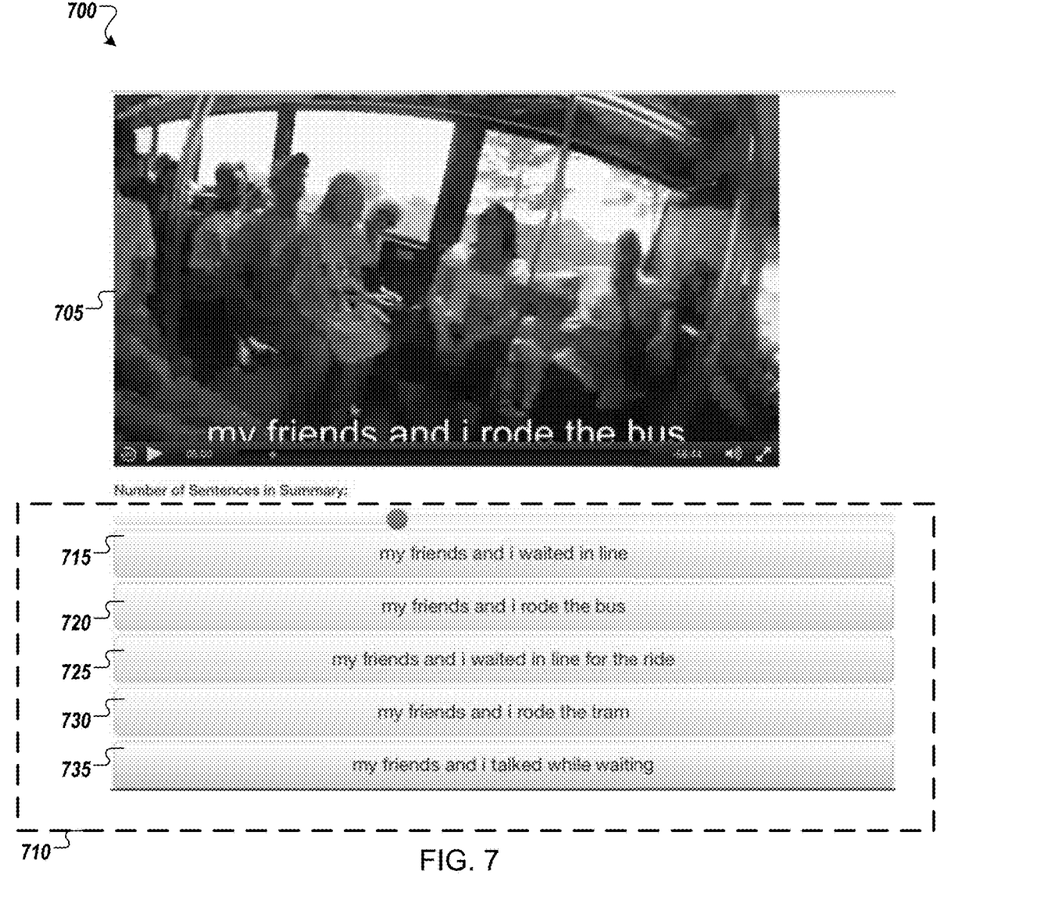
FIG. 7 illustrates an example media summary produced according to example implementations of the present application.

Once the captions have been generated, a media summary may be generated based on the captions at 125. In some example implementations, the generated media summary may be an aggregation of the generated captions arranged in the order the segments occur in the media file. In other example implementations, the media summary may include the aggregation of the captions along with a notation of the time the associated segment starts (and/or ends) or link to the start of the segment associated with the caption. FIG. 7 illustrates an example implementation of a generated media summary 700. After automatically generating a media summary based on the generated captions, long media files may be reviewed by a user more efficiently.

In some example implementations, the process 100 may end once the media summary has been generated. In other example implementations, the generated media summary may be evaluated to determine whether it is fully representative of the content of the media file at 130. This evaluation may be manually done by a user reviewing the media summary and indicating whether the media summary is acceptable in some example implementations. In other example implementations, the media summary may be automatically evaluated by a computing device by determining whether segments used to generate the media summary represent proportional distribution of the entire media file. For example, a media summary may be determined to be an accurate summary of the whole media file if the captioned segments are distributed throughout the media file (e.g., one or more captioned segments are near the beginning, one or more captioned segments occurring in the middle, and one or more captioned segments are near the end of the media file). Conversely, if all captioned segments are from only a small portion of the media file (e.g., all segments are from the beginning of the media file, or the end of the media file), the media summary may be determined to not be an accurate summary of the whole media file.

If the generated media summary is determined to be fully representative of the media file (Yes at 130), the process 100 may end. If the generated media is determined to not be fully representative of the media file (No at 130), the process 100 may return to 110 to calculate importance scores for each segment again, and select additional candidates for captioning based on the importance scores. In some example implementations, the additional segments selected may have lower importance scores than the previously selected segments but be located in portions of the media file not represented by the previously selected segments (e.g., additional segments selected from the end of the media file when previously selected candidates were all located at the beginning or additional segments selected from the beginning of the media file when previously selected candidates were all located at the ending).

Additionally, in some example implementations, the media file may optionally be re-segmented based on the generated media summary at 135 prior to calculating the importance scores for each segment a second (or third, fourth, etc.) time. For example, based on the generated media summary summarizing segments at the beginning of the media file, the media file may be re-segmented to break the un-captioned portion (e.g., ending) of the media file into smaller segments to attempt to extract content that may not have been recognized or represented in the first segmentation. Other re-segmentation strategies may be apparent to a person of ordinary skill in the art. Once the media file has been re-segmented, the process 100 may return back to 110 as discussed above.

Once the generated media summary is determined to be fully representative of the media file (Yes at 130), the process 100 may end. Additionally, in some example implementations, the process 100 may also automatically end after a defined number of repetitions. (e.g., the process 100 may automatically end after steps 110-125 have been performed two times, three times, or any number of times that may be apparent to a person of ordinary skill in the art). The number of repetitions may be specified by a user.

Figure 2:
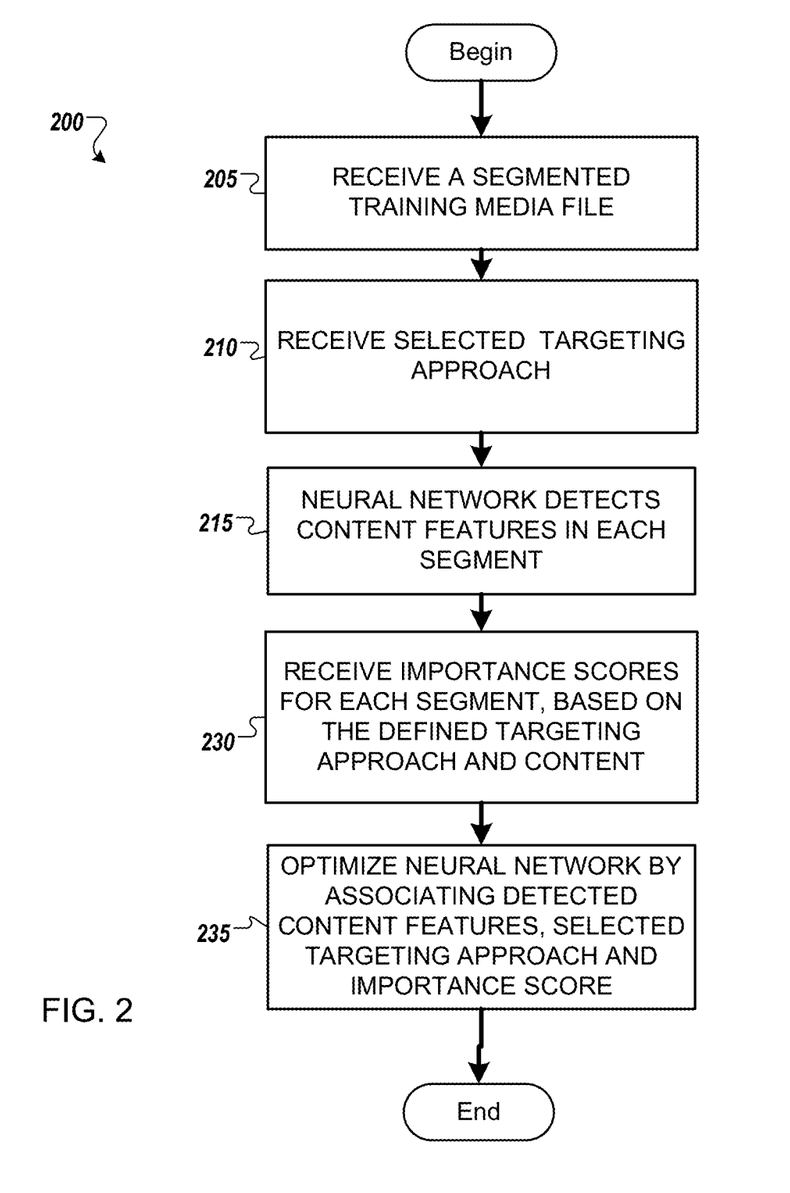
FIG. 2 illustrates an example flow diagram of a process for training a neural network to calculate importance scores according to example implementations of the present application.

FIG. 2 illustrates an example flow diagram of a process 200 for training a neural network to calculate importance scores according to example implementations of the present application. Trained the neural network may generate an importance score prediction model or matrix that be used to calculate importance scores for media segments of a media file during a process, such as process 100 illustrated in FIG. 1.

In the process 200, a segmented training media file may be received by the neural network at 205. The training media file may be captured using a video recording device (such as a video camera), an audio recording device (such as a microphone and digital recorder), or any other media recording device that may be apparent to a person of ordinary skill in the art. In some example implementations, the training process may be performed using a plurality of segmented training media files, with the process 200 being repeated for each of the plurality of segmented training media files.

The segmented training media file may be received by any data communications mechanism that may be apparent to a person of ordinary skill in the art, including, but not limited to, a USB connection, a serial connection, a parallel connection, or a wireless communication connection. The training media file may be a video file, an audio file, or any other continuous media files capable of being divided into segments. Additionally, in some example implementations multiple training media files may be used and the multiple training media files may be any combination of video files, audio files, or any other type of continuous media files that may be apparent to a person of ordinary skill in the art.

Again, the size of each segment is not particularly limited. In some example implementations, each segment may be a single still frame of video, a few second of video, or a video segment of any length that might be apparent to a person of ordinary skill in the art. In other example implementations, each segment may be a second of audio, a few seconds of audio or an audio segment of any length that might be apparent to a person of ordinary skill in the art The media file may be segmented by a manual process performed by a user, a fully automated process, or hybrid process involving some automation and some user control as discussed above with respect to process 100 of FIG. 1 at 105.

At 210, the neural network may receive a targeting approach. The targeting approach may be received by any data communications mechanism that may be apparent to a person of ordinary skill in the art, including, but not limited to, a USB connection, a serial connection, a parallel connection, or wireless communication connection. The targeting approach may be selected from a variety of targeting approaches including the example targeting approaches discussed above with respect to 110 of the process 100 of FIG. 1.

At 215, the neural network detects one or more content features associated with each training segment of the training media file using one or more content detection techniques. For example, object recognition, character recognition, and/or facial recognition techniques may be applied to images in the training segments to determine image content. Similarly, audio recognition techniques may be applied to audio in the training segments to detect speaker changes, and recognize speech in the audio to identify speech content. Additionally, metadata associated with the training segments of the media file may be analyzed to detect time and date information associated with the training media file. Further, the metadata may also include location data, such as GPS information, that could be used to detect locations where the segments of the training media file have been captured.

At 230, the neural network receives importance scores for each training segment based on the targeting approach and media content. Importance scores may be manually determined by a user or may be calculated by a hybrid process involving the neural network calculating the importance score and a user approving, rejecting, or adjusting the calculated importance score.

In some example implementations, the received importance scores for each training segment may be provided in real time by a user reviewing the training segments in response to inquiries from the neural network. In other example implementations, the importance scores may be associated with the training segments before, or at the time, the training segments are received by the neural network at 205.

Based on the detected content features, the received targeting approach, and the received importance scores, the neural network may be optimized or fine-tuned by associating the detected content features with the importance scores and the received targeting approach at 235. Once the neural network has been optimized or fine-tuned at 235, the process 200 may end. Once trained, the neural network may be used to calculating an importance score in a process, such as process 100 of FIG. 1 at 110.

As discussed above, the training of the neural network may involve repeating the process 200 for a plurality of segmented training media files. In some example implementations, the training process may be performed by using one or more public benchmark data sets such as "TVSUM", "Videoset", "SumMe", or any other publically available data set.

Figure 3:
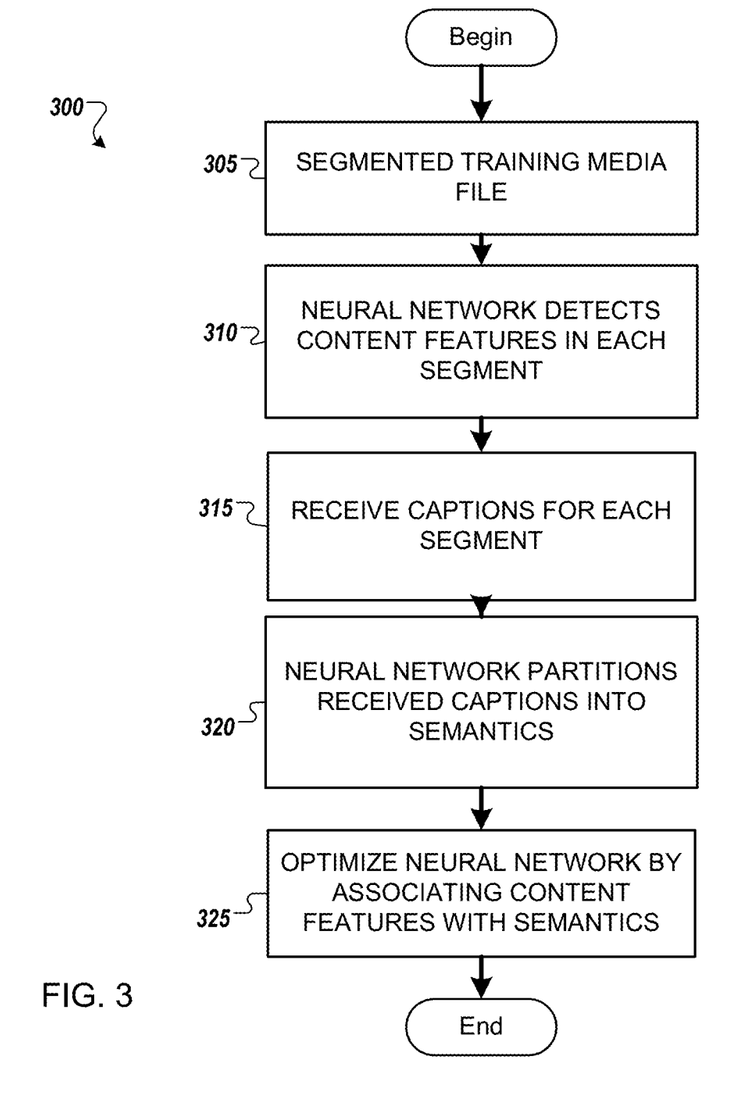
FIG. 3 illustrates an example flow diagram of a process for training a neural network to generate captions according to example implementations of the present application.

FIG. 3 illustrates an example flow diagram of a process 300 for training a neural network to generate captions according to example implementations of the present application. Training the neural network may generate a caption generation model that may be used to generate captions for media segments of a media file during a process, such as process 100 illustrated in FIG. 1.

In the process 300, a segmented training media file may be received by the neural network at 305. The training media file may be captured using a video recording device (such as a video camera), an audio recording device (such as a microphone and digital recorder), or any other media recording device that may be apparent to a person of ordinary skill in the art. In some example implementations, the training process may be performed using a plurality of segmented training media files, with the process 300 being repeated for each of the plurality of segmented training media files.

The segmented training media file may be received by any data communications mechanism that may be apparent to a person of ordinary skill in the art, including, but not limited to, a USB connection, a serial connection, a parallel connection, or a wireless communication connection. The training media file may be a video file, an audio file, or any other continuous media files capable of being divided into training segments. Again, the size of each training segment is not particularly limited. In some example implementations, each training segment may be a single still frame of video, a few second of video, or a video segment of any length that might be apparent to a person of ordinary skill in the art. In other example implementations, each training segment may be a second of audio, a few seconds of audio or an audio segment of any length that might be apparent to a person of ordinary skill in the art The media file may be segmented by a manual process performed by a user, a fully automated process, or hybrid process involving some automation and some user control as discussed above with respect to the process 100 of FIG. 1 at 105.

At 310, the neural network may detect one or more content features associated with each training segment of the training media file using one or more content detection techniques. For example, object recognition, character recognition, and/or facial recognition techniques may be applied to images in the training segments to determine image content. Similarly, audio recognition techniques may be applied to audio in the training segments to detect speaker changes, and recognize speech in the audio to identify speech content. Additionally, metadata associated with the segments of the media file may be analyzed to detect time and date information associated with the training media file. Further, the metadata may also include location data, such as GPS information, that could be used to detect locations where the segments of the media file have been captured.

At 315, the neural network receives one or more captions for each training segment. Captions may be manually generated by a user or may be generated by a hybrid process involving the neural network generating the caption based on a caption generation model and a user approving, rejecting, or adjusting the generated caption.

In some example implementations, the received captions for each training segment may be provided in real time by a user reviewing the training segments in response to inquiries from the neural network. In other example implementations, the received captions may be associated with training segments before, or at the time, the training segments are received by the neural network at 305 discussed above.

After the captions have been received, the neural network may partition the captions into semantics based on known language partitioning algorithms used for text or speech recognition at 320. In some example implementations, the neural network may partition the captions into semantics (e.g., lexical units such as syllables, words and phrases) in order to detect the subject matter being expressed in the received captions.

Once the captions received for each segment are partitioned into semantics, the neural network may be optimized or fine-tuned by associating the detected content features with the partitioned semantics at 325. Once the neural network has been optimized or fine-tuned at 325, the process 300 may end. Once trained, the neural network may be used in a process, such as process 100 of FIG. 1 at 120.

As discussed above, the training of the neural network may involve repeating the process 300 for a plurality of segmented training media files. In some example implementations, the training process may be performed by using one or more public benchmark data sets such as "MSR-VTT", "MSVD", "VideoSet", or any other publically available data set.

Figure 4:
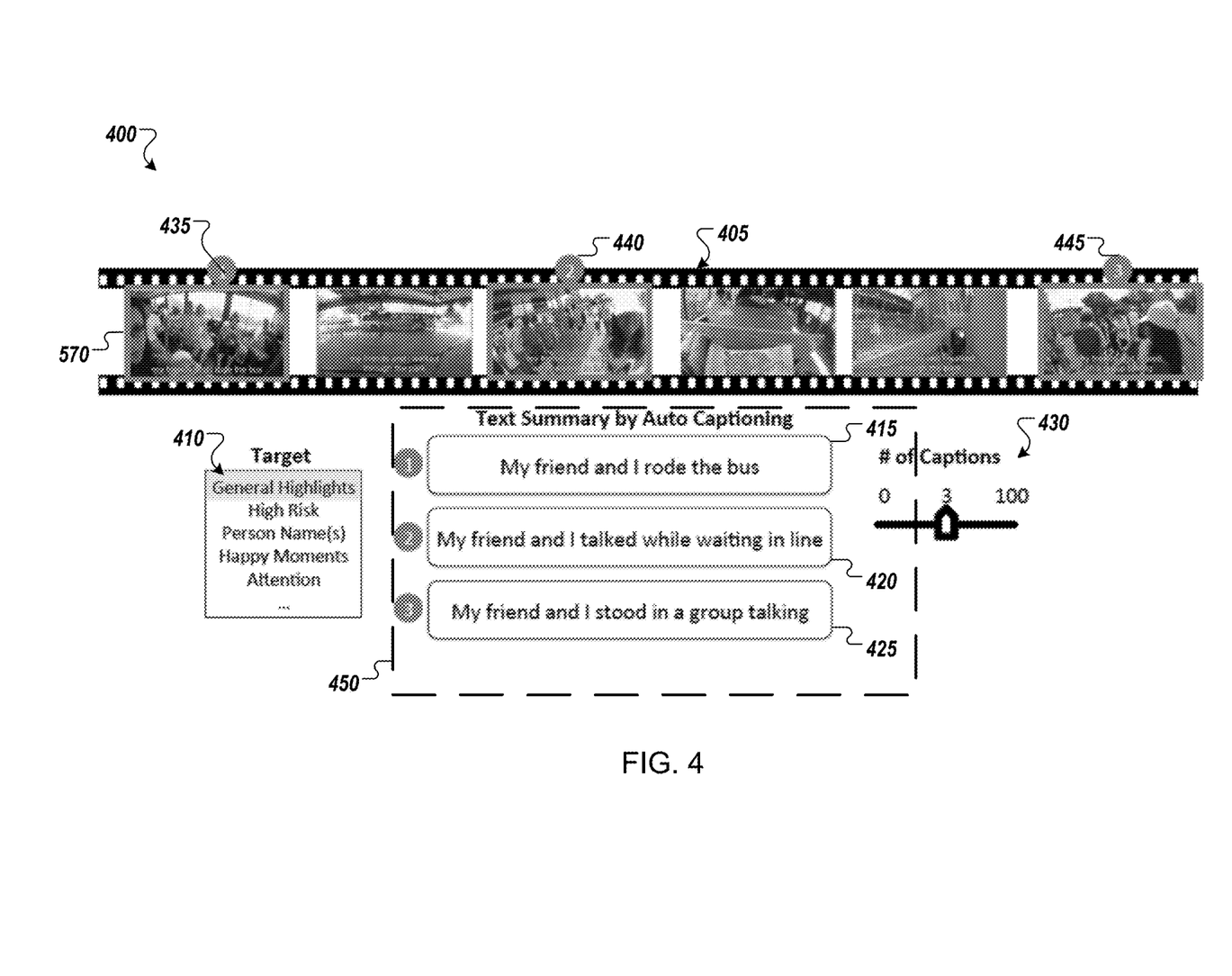
FIG. 4 illustrates a user interface used to generate captions and media summaries usable in example implementations of the present application.

FIG. 4 illustrates a user interface (UI) 400 used to generate captions and media summaries usable in example implementations of the present application. The UI 400 may be displayed on a display device associated with a computing device, a media editing device, or any other device capable of displaying information to a user. The UI 400 may be controlled using a user input device such as a mouse, touch-pad, track ball, keyboard, or any other user input device that may be apparent to a person of ordinary skill in the art. As illustrated, the UI 400 includes a graphical representation 405 of a media file 570 being captioned and summarized. The UI 400 also includes a control interface 410 to allow a user to select a targeting approach. As illustrated the control interface 410 may be a selectable text list, but other example control interfaces, such as control buttons, drop down lists, or any other control interface, may also be used.

The content features to be targeted for use in calculating importance scores and captioning may be modified based on the targeting approach chosen by the user. For example, options of targeting approaches may include "General Highlights," "High Risk," "Person Name(s)," "Happy Moments," "Attention," etc. that are designed to fulfill a variety of purposes or applications. Potential targeting approaches are discussed in greater detail above with respect to FIG. 1.

The UI 400 also allows users to adjust the number of captions to be generated for the given media file using a control interface 430. In some example implementations, the number of captions specified may also determine the number of media segments selected based on importance scores. As illustrated the control interface 430 may be a slider control, but other example control interfaces, such as control buttons, drop down lists, text entry boxes or any other control interface that may be apparent, may be used. Adjusting the control interfaces 410 and 430 may cause the process 100 of FIG. 1, or portions of the process to be re-performed.

Based on the user interactions with the control interfaces 410 and 430, one or more captions 415, 420, 425 may be generated and displayed on the UI 400. Additionally, the UI 400 may also highlight the segments 435, 440, 445 corresponding to the displayed captions 415, 420, 425 on the graphical representation 405 of the media file 570. As illustrated, segment 435 corresponds to caption 415, segment 440 corresponds to caption 420, and segment 445 corresponds to caption 415.

The captions 415, 420, 425 displayed are the captions corresponding to the media segments 435, 440, 445 having the highest importance sores with respect to the criteria of the targeting approach selected using the control interface 410. More captions may be displayed and more segments highlighted based on the setting of the control interface 430. By increasing the number of captions to be generated, the high-level semantics (e.g., lexical units such as syllables, words and phrases) of more segments may be revealed to users, and the users can look over more details in text but still focus on the content that they want to target. Conversely, users may be able to skip details by decreasing the number of generated captions using control interface 430 if faster review and navigation of the media file is desired or needed.

The UI 400 also provides a summary 450 of the media file 570 by aggregating and ordering the generated captions 415, 420, 425 based on the sequence of segments in the media file. This illustrated UI 400 is merely exemplary and example implementations are not limited thereto. Other example UIs may be apparent to a person of ordinary skill in the art.

Figure 5:
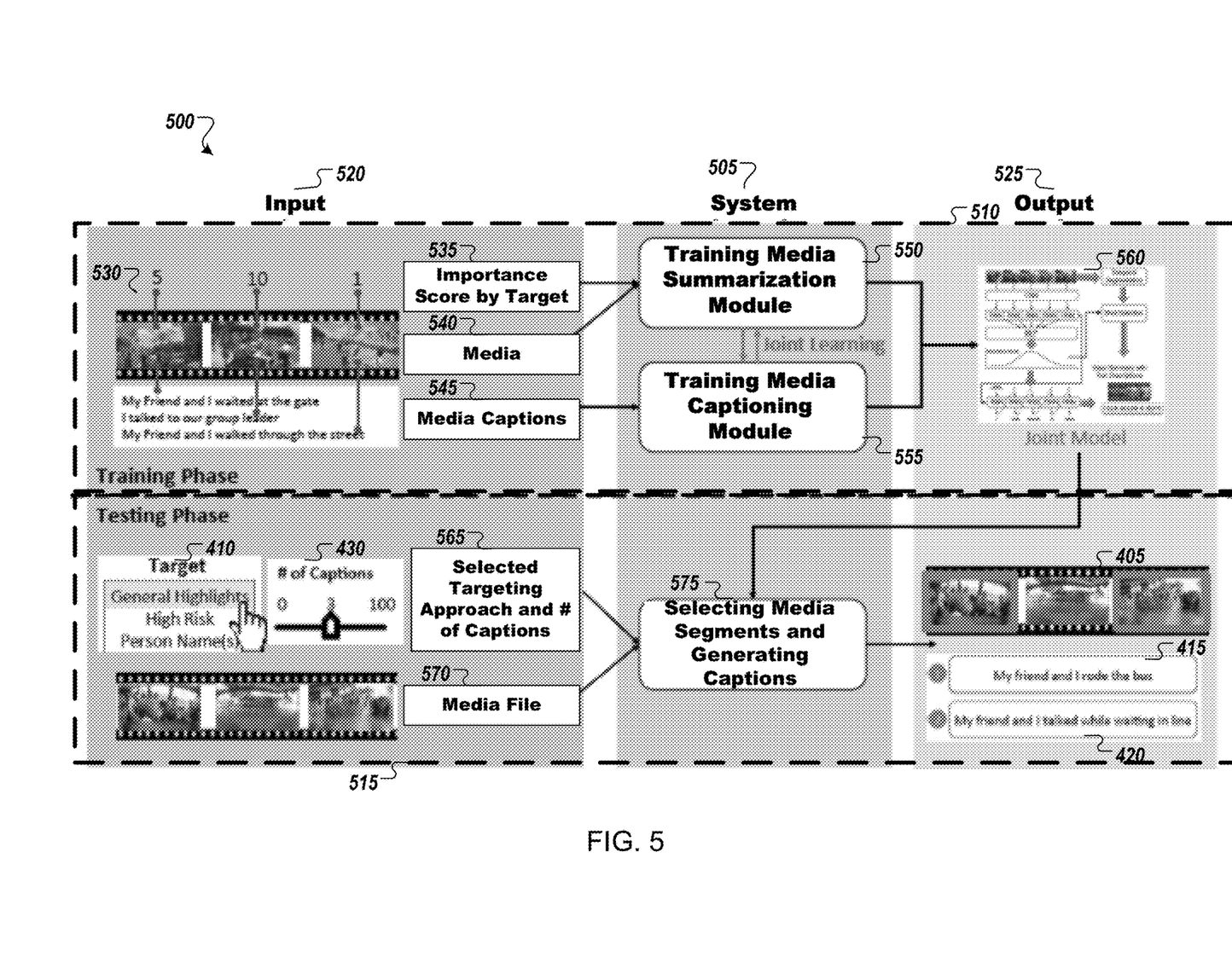
FIG. 5 illustrates a schematic diagram of example implementations of the present application.

FIG. 5 illustrates a conceptual diagram 500 of a system 505 according to an example implementation of the present application. The diagram 500 illustrates both input 520 and output 525 of the system 505 during two different phases (a training phase 510 and testing phase 515).

During the training phase 510, the system 505 receives one or more sequences of training data (graphically represented by 530). Each data sequence 530 may include at least three components, 1) importance scores 535, 2) a training media file 540 composed of a sequence of training segments, and 3) captions 545. Each training segment in the training media file 540 has a corresponding importance score 535. The importance score 535 of each segment may vary with respect to different options of targeting approaches (e.g., "General Highlight", "High-Risk Scene", "Person Name", etc. as discussed above with respect to FIG. 1). Each training segment in a training media 540 file may comprise one or more frames and has a corresponding caption 545.

The system 505 may include two major modules: a training media summarization module 550 that calculates an importance score of each segment to allow selecting the import media segments, and a training media captioning module 555 that generates captions of media segments. Each module 550, 555 may be embodied by a neural network, either a single combined neural network or a pair of separate neural networks. The training media summarization module 550 may perform the training process 200 illustrated in FIG. 2. The training media captioning module 555 may perform the training process 300 illustrated in FIG. 3. The two modules 550 and 555 may be jointly trained through multi-task learning as a joint optimization method. The output of the system 505 during the training phase 510 is a joint model 560. Different joint models 560 may be generated for each targeting approach option discussed above. The joint model 560 is discussed in greater detail below with respect to FIG. 6.

The joint model 560 may then be used by the system 505 during the testing phase 515. Specifically, during the testing phase 515, the system 505 interacts with users by receiving targeting approach and caption number options 565. The targeting approach and caption number options 565 may be entered by a user using the control interfaces 410, 430 illustrated in the UI 400 or any other user input that might be apparent to a person of ordinary skill in the art.

The input data of the testing phase 515 includes the targeting approach and caption number options 565 and the media file 570 comprising a plurality of segments to be captioned and summarized. The media file 570 may be the same media file 570 discussed above with respect to FIG. 4. The system 505 then uses the selected targeting approach and caption number options 565 to decide which joint model 560 to be used. As discussed above, each targeting approach may correspond to a different joint model 560 because each targeting approach may have different criteria in terms of determining importance of segments that affect the assignment of importance scores calculated.

With the joint model 560 selected based on the targeting approach and caption number options 565, the system 505 may then calculate importance scores for each segment of the media file 570. The system 505 may then select media segments for captioning based on the calculated importance scores, and generates the captions accordingly, resulting in a media summary with text descriptions using a process, such as process 100 of FIG. 1. The output 525 of the system 505 during the testing phase 515 may be a graphical representation 405 (from UI 400 of FIG. 4) of the media file 570 and a plurality of captions 415 and 420 (from UI 400 of FIG. 4).

Figure 6:
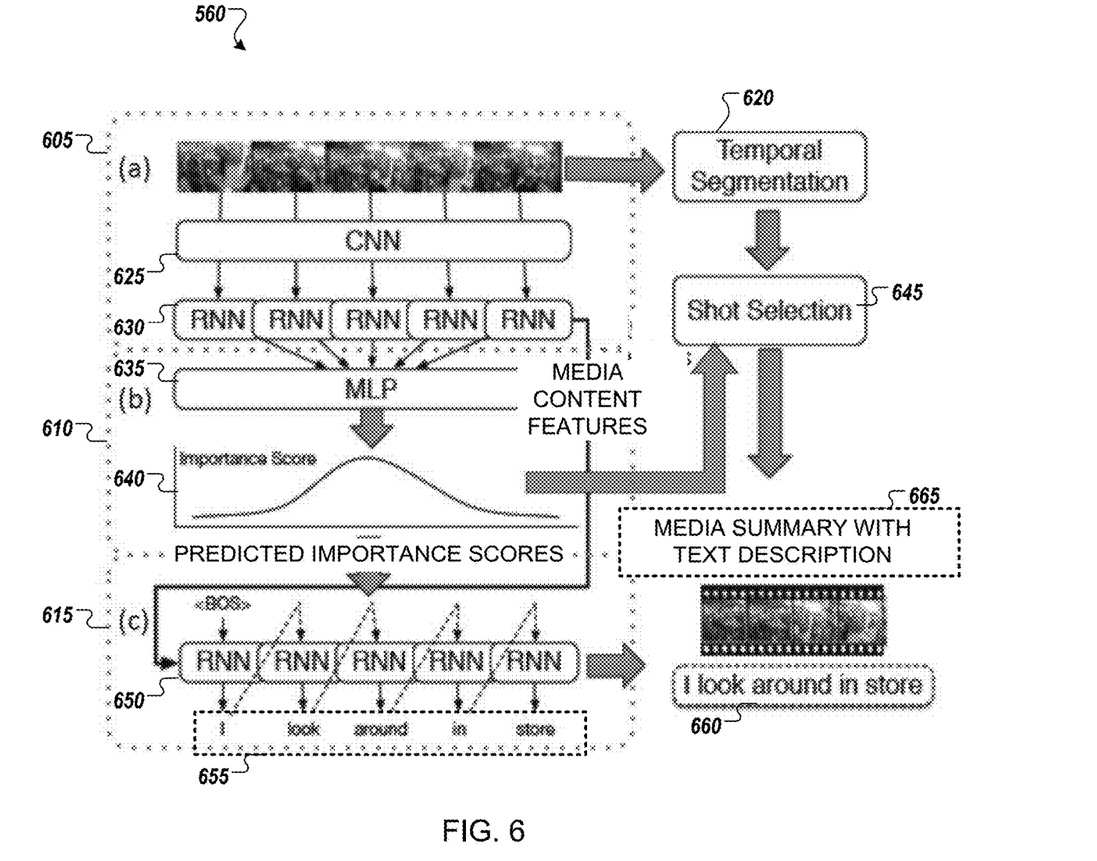
FIG. 6 illustrates a schematic diagram of a joint model usable in example implementations of the present application.

FIG. 6 illustrates a schematic diagram of a joint model 560 usable in example implementations of the present application. FIG. 6 illustrates additional details about the architecture of the joint model 560 not discussed above with respect to FIG. 5. As illustrated, the joint model 560 may include three major components: a media feature extraction unit 605, an importance score predicting model 610, configured with a loss function based on input importance scores, and the corresponding media segments, and a caption generating model 615, configured with a loss function based on input captions and the corresponding media segments. The loss function of the importance score predicting model 610 may be configured during a training process, such as process 200 of FIG. 2. The loss function of the caption generating model 615 may be configured during a training process, such as process 300 of FIG. 3.

The media feature extraction unit 605 may segment a received media file into a plurality of media file segments arranged in a temporal order (Temporal Segmentation 620). The Convolutional Neural Network (CNN) 625 and a series of recurrent neural networks (RNN) 630 may then detect or extract media content features from each of the segments. The extracted media content features may then be provided to both the importance score predicting model 610 and the caption generating model 615.

In the importance score predicting model 610, the extracted media content features from the RNNs 630 are provided to a multi-layer perceptron neural network (MLP) 635 to calculate and map a distribution of importance scores 640 for each of the segments. The calculation and mapping of the distribution is based on the training of importance score predicting model 610 and configuration of the loss function using the training process 200 of FIG. 2. Once the distribution of importance scores 640 is mapped, the media content features having the highest importance scores are used to select the segments (or shots) to be used to generate captions (shot selection 645).

In the caption generating model 615, the extracted media content features from RNNs 630 and the importance scores predicted by the importance score predicting model 610 are provided to a series of RNNs 650 that select and arrange a series of semantics (e.g., lexical units such as syllables, words and phrases) 655. Based on the selected and arranged semantics 655, a caption 660 is generated for each selected segment. Further based on the captions 660 generated for each selected segment, a media summary 665 with text descriptions of the content features of the media file is generated.

Additionally, the loss function associated with the importance score predicting model 610 may be optimized based on the output of the caption generating model 615. Similarly, the loss function associated with the caption generating model 615 may be optimized based on output from the importance score predicting model 610. Further, the optimization losses of both the importance score predicting model 610 and the caption generating model 615 may be used to refine the parameters of the media feature extraction unit 605 through back-propagation to alter how the content features are extracted. These joint optimization processes may be implemented by using multi-task learning.

As illustrated, the joint model 560 may allow captioning of selected video segments for targeting a specific perspective (targeting approach) requested by a user. The machine learning modules may use the context of video captioning to influence video summarization and vice versa. Further, the generated captions may present semantic text descriptions of corresponding video content and the level detail may be adjusted by increasing or decreasing the number of generated captions automatically or based on user input.

FIG. 7 illustrates an example media summary 700 produced according to example implementations of the present application. The media summary 700 may be an interactive User Interface UI displayed on a display device associated with a computing device, a media editing device, or any other device capable of displaying information to a user. The media summary 700 may be controlled using a user input device such as a mouse, touch-pad, track ball, keyboard, or any other user input device that may be apparent to a person of ordinary skill in the art.

As illustrated, the media summary 700 may include a playback window 705 of the media file. Near the playback window 705, a textual summary 710 of the media file may be provided. The textual summary 710 may include a series of captions 715, 720, 725, 730, 735 of different segments of the media file. The captions 715, 720, 725, 730, 735 may be arranged in a sequence based on the order of segments in the media file. Additionally, in some example implementations, the captions 715, 720, 725, 730, 735 may be links that can be activated to navigate to the associated segment. For example, activating the link of caption 725 may cause the playback window 705 to jump to the segment associated with the caption 725.

Example Caption Generation Evaluation Results

To compare an example implementation of the present application with related-art systems, experiments were conducted using two public benchmark datasets, TVSUM and MSR-VTT. The TVSUM dataset may be used to evaluate whether the joint model could predict more accurate importance scores than the related art video summarization systems, and the MSR-VTT dataset may be used to evaluate whether the joint model can generate more relevant captions than the related art video captioning systems. The results of these comparisons are illustrated in Tables 1 and 2 below.

TABLE 1

| Video Summarization Comparison | |
|---|---|
| TVSUM Dataset | F-Score |
| Related art Video Summarization Systems | 0.59 |
| Example Implementation of Joint Model | 0.62 |

As illustrated in Table 1, the example implementation of the Joint Model provided a 3% improvement in F-Score, which is a measure of both precision and recall, over the related art video summarization systems.

TABLE 2

Video Captioning Comparison

| MSR-VTT Dataset | BLEU@4 | METEOR |
|---|---|---|
| Related art Video Caption Systems | 35.4 | 25.4 |
| Example Implementation of Joint Model | 37.5 | 25.9 |

As illustrated in Table 2, the example implementation of the Joint Model provided improvements over the related art video caption systems as measured in both in BLEU@4 and METEOR measures, which both reflect relevance to the ground-truth captions.

Example Environment

Figure 8:
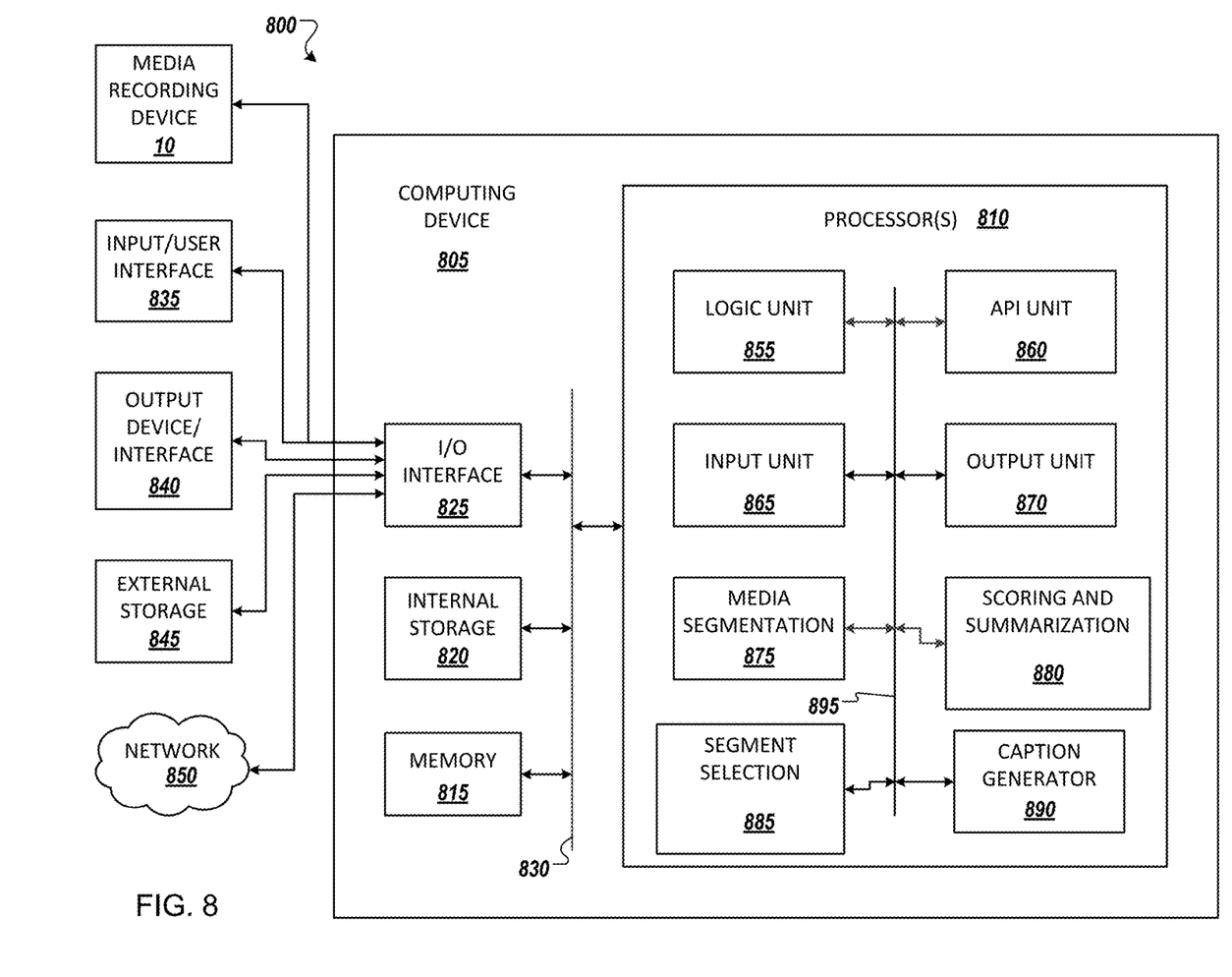
FIG. 8 illustrates an example environment with an example computer device suitable and media recording device suitable for use for use in some example implementations.

FIG. 8 illustrates an example environment 800 with an example computing device 805 and media recording device 10 suitable for use in some example implementations. The media recording device 10 may be a video recording device, such as a video camera, a web camera, a surveillance camera, or any other video capture device that may be apparent to a person of ordinary skill in the art. The media recording device 10 may also be an audio recording device, such as a voice recorder, a microphone connected to an audio recorder, or any other audio recording device that may be apparent to a person of ordinary skill in the art. The media recording device 10 may also be any other media capture device that may be apparent to a person of ordinary skill in the art.

The Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 805 can be communicatively coupled (e.g., via I/O interface 825) to external storage 845, the media recording device 10, and a network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 855, application programming interface (API) unit 860, input unit 865, output unit 870, media segmentation unit 875, scoring and summarization unit 880, segment selection unit 885, caption generator unit 890, and inter-unit communication mechanism 895 for the different units to communicate with each other, with the OS, and with other applications (not shown). For example, the media segmentation unit 875, scoring and summarization unit 880, segment selection unit 885, caption generator unit 890 may implement one or more processes shown in FIGS. 1-3. The described units and elements can be varied in design, function, configuration, or implementation and are not limited to the descriptions provided.

In some example implementations, when information or an execution instruction is received by API unit 860, it may be communicated to one or more other units (e.g., logic unit 855, input unit 865, output unit 870, media segmentation unit 875, scoring and summarization unit 880, segment selection unit 885, caption generator unit 890). For example, when a media file is received from the media recording device 10 via the input unit 865, the media segmentation unit 875 may divide the media file into segments. Further, the scoring and summarization unit 880 may analyze each segment to determine an importance score and summarize segment content. Additionally, after the scoring and summarization unit 880 calculates the importance scores, the segment selection unit 885 may select one or more segments to generate captions, and the caption generator 890 may generate a caption for the selected segments that can be output using the output unit 870.

In some instances, the logic unit 855 may be configured to control the information flow among the units and direct the services provided by API unit 860, input unit 865, output unit 870, media segmentation unit 875, scoring and summarization unit 880, segment selection unit 885, caption generator unit 890 in some example implementations described above. For example, the flow of one or more processes or implementations may be controlled by logic unit 855 alone or in conjunction with API unit 860.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

We claim:

1. A method of generating a summary of a media file containing at least a portion representative of a triggering event, the media file comprises a plurality of temporally separated media segments, the method comprising:
    calculating, by a neural network, respective importance scores for each of the temporally separated media segments, based on content features associated with each of the media segments and a targeting approach, the importance scores representative of the media segments containing content features indicative of the triggering event, wherein the triggering event in the media file is detected based on a dynamically selected targeting approach, which defines content features and changes in content features to be detected in the media file to identify the trigger event;;
    selecting a first media segment from the temporally separated media segments, based on the calculated importance scores indicative of the triggering event;
    generating a first caption for the selected first media segment based on the content features associated with the selected media segment; and
    generating a summary of the media file based on the first caption.

2. The method of claim 1, further comprising:
    determining whether the summary represents the media file; and
    re-segmenting the media file into another plurality of media segments based on the generated summary.

3. The method of claim 2, further comprising:
    calculating, by the neural network, respective other importance scores for each of the other plurality of temporally separated media segments based on other content features associated with each of the other plurality media segments and the targeting approach;
    selecting at least one other media segment from of the other plurality of media segments, based on the other importance score;
    automatically generating another caption for the at least one other media segment based on the other content features associated with the selected at least one other media segment; and
    generating another summary of the media file based on the other caption.

4. The method of claim 1, wherein the selected targeting approach is selected from a plurality of potential targeting approaches comprising one or more of:
    summarizing one or more events occurring during the media file;
    classifying one or more events occurring during the media file as abnormal;
    summarizing activities associated with an entity selected from a group of entities represented in the media file; and
    detecting and summarizing states of an entity associated with events occurring during the media file.

5. The method of claim 1, wherein:
    the generating a caption is performed using another neural network different from the neural network;
    wherein the neural network and the other neural network are jointly trained.

6. The method of claim 5, further comprising training the other neural network by:
    receiving, by the other neural network, a training media file that comprises a plurality of temporally separated training segments;
    detecting a content feature associated with each of the plurality of temporally separated training segments by the other neural network;
    receiving a caption for each of the temporally separated training segments;
    partitioning, by the other neural network, the received caption for each temporally separated training segment into semantics; and
    associating, by the other neural network, the detected content features with the partitioned semantics to generate a caption generating model.

7. The method of claim 1, further comprising training the neural network by:
    receiving, by the neural network, a training media file that comprises a plurality of temporally separated training segments;
    receiving the targeting approach;
    detecting a content feature associated with each of the plurality of temporally separated training segments by the neural network;
    receiving an importance score for each of the temporally separated training segments by the neural network; and
    associating, by the neural network, the content feature, the received targeting approach, and the received importance score to generate an importance score predicting model.

8. The method of claim 1, wherein the dynamically selected targeting approach includes one or more of:
    detecting content features and changes in content features associated with different events detected within a long duration media file containing a plurality of different events;
    detecting content features and changes in content features associated with dangerous or abnormal events detected within a media file associated with surveillance recording;
    detecting content features and changes in content features associated with an identified person detected within the media filed;
    detecting content features and changes in content features associated with one or more emotional states of an identified person detected within the media file; and detecting content features and changes in content features associated with intervals of attention of an identified person capturing a first person perspective media file.

9. The method of claim 1, the method further comprising:
selecting a second media segment from the temporarily separated media segments, based on the calculated importance scores indicative of the triggering event;
generating a second caption for the selected second media segment based on the content features associated with the selected media segment; and
generating a summary of the media file based on the first and the second caption.

10. A non-transitory computer readable medium having stored therein a program for making a computer execute a method of generating a summary of a media file containing at least a portion representative of a triggering event, the media file comprises a plurality of temporally separated media segments, the method comprising:
calculating, by a neural network, respective importance scores for each of the temporally separated media segments, based on content features associated with each of the media segments and a targeting approach, the importance scores representative of the media segments containing content features indicative of the triggering event, wherein the triggering event in the media file is detected based on a dynamically selected targeting approach, which defines content features and changes in content features to be detected in the media file to identify the trigger event;
selecting a first media segment from the temporally separated media segments, based on the calculated importance scores indicative of the triggering event;
generating a first caption for the selected first media segment based on the content features associated with the selected media segment;
selecting a second media segment from the temporarily separated media segments, based on the calculated importance scores indicative of the triggering event
generating a second caption for the selected second media segment based on the content features associated with the selected media segment; and
generating a summary of the media file based on the first and the second caption.

11. The non-transitory computer readable medium of claim 10, further comprising:
determining whether the summary represents the media file; and
re-segmenting the media file into another plurality of media segments based on the generated summary.

12. The non-transitory computer readable medium of claim 11, further comprising:
calculating, by the neural network, respective other importance scores for each of the other plurality of temporally separated media segments based on other content features associated with each of the other plurality media segments and the targeting approach;
selecting at least one other media segment from of the other plurality of media segments, based on the other importance score;
automatically generating another caption for the at least one other media segment based on the other content features associated with the selected at least one other media segment; and
generating another summary of the media file based on the other caption.

13. The non-transitory computer readable medium of claim 10, wherein the selected targeting approach is selected from a plurality of potential targeting approaches comprising one or more of:
summarizing one or more events occurring during the media file;
classifying one or more events occurring during the media file as abnormal;
summarizing activities associated with an entity selected from a group of entities represented in the media file; and
detecting and summarizing states of an entity associated with events occurring during the media file.

14. The non-transitory computer readable medium of claim 10, wherein:
the generating a caption is performed using another neural network different from the neural network;
wherein the neural network and the other neural network are jointly trained.

15. The non-transitory computer readable medium of claim 14, further comprising training the other neural network by:
receiving, by the other neural network, a training media file that comprises a plurality of temporally separated training segments;
detecting a content feature associated with each of the plurality of temporally separated training segments by the other neural network;
receiving a caption for each of the temporally separated training segments;
partitioning, by the other neural network, the received caption for each temporally separated training segment into semantics; and
associating, by the other neural network, the detected content features with the partitioned semantics to generate a caption generating model.

16. The non-transitory computer readable medium of claim 10, further comprising training the neural network by:
receiving, by the neural network, a training media file that comprises a plurality of temporally separated training segments;
receiving the targeting approach;
detecting a content feature associated with each of the plurality of temporally separated training segments by the neural network;
receiving an importance score for each of the temporally separated training segments by the neural network; and
associating, by the neural network, the content feature, the received targeting approach, and the received importance score to generate an importance score predicting model.

17. A media analysis device comprising:
a communications bus configured to receive a media file containing at least a portion representative of a triggering event, the media file comprises a plurality of temporally separated media segments;
a memory configured to store the media file;
a processor executing a process comprising:
calculating, by a neural network, respective importance scores for each of the temporally separated media segments, based on content features associated with each of the media segment and a targeting approach, the importance scores representative of the media segments containing content features indicative of the triggering event, wherein the triggering event in the media file is detected based on a dynamically selected targeting approach, which defines content features and changes in content features to be detected in the media file to identify the trigger event;

selecting a first media segment from the temporally separated media segments, based on the calculated importance scores indicative of the triggering event;

generating a first caption for the selected first media segment based on the content features associated with the selected media segment selecting a second media segment from the temporarily separated media segments, based on the calculated importance scores indicative of the triggering event;

generating a second caption for the selected second media segment based on the content features associated with the selected media segment; and generating a summary of the media file based on the first and the second caption.

18. The device of claim 17, wherein the processor further executes the process comprising:

determining whether the summary represents the media file; and re-segmenting the media file into another plurality of media segments based on the generated summary.

19. The device of claim 18, wherein the processor further executes the process comprising:

calculating, by the neural network, respective other importance scores for each of the other plurality of temporally separated media segments based on content features associated with each of the other plurality media segments and the targeting approach;

selecting at least one other media segment from of the other plurality of media segments, based on the other importance score;

automatically generating another caption for the at least one other media segment based on the other content features associated with the selected at least one other media segment; and generating another summary of the media file based on the other caption.

20. The device of claim 17, wherein the selected targeting approach is selected from a plurality of potential targeting approaches comprising one or more of:

summarizing one or more events occurring during the media file;

classifying one or more events occurring during the media file as abnormal;

summarizing activities associated with an entity selected from a group of entities represented in the media file; and detecting and summarizing states of an entity associated with events occurring during the media file.

21. The device of claim 17, wherein the processor further executes the process comprising:

the generating a caption is performed using another neural network different from the neural network;

wherein the neural network and the other neural network are jointly trained.

22. The device of claim 17, wherein the processor further executes the process comprising:

training the neural network by:

receiving, by the neural network, a training media file that comprises a plurality of temporally separated training segments;

receiving the targeting approach;

detecting a content feature associated with each of the plurality of temporally separated training segments by the neural network;

receiving an importance score for each of the temporally separated training segments by the neural network; and associating, by the neural network, the content feature, the received targeting approach, and the received importance score to generate an importance score predicting model; and training the other neural network by:

receiving, by the other neural network, a training media file that comprises a plurality of temporally separated training segments;

detecting a content feature associated with each of the plurality of temporally separated training segments by the other neural network;

receiving a caption for each of the temporally separated training segments;

partitioning, by the other neural network, the received caption for each training segment into semantics; and associating, by the other neural network, the detected content features with the partitioned semantics to generate a caption generating model.

* * * * *